US011734788B2

(12) United States Patent
Howson et al.

(10) Patent No.: US 11,734,788 B2
(45) Date of Patent: *Aug. 22, 2023

(54) TASK EXECUTION IN A SIMD PROCESSING UNIT WITH PARALLEL GROUPS OF PROCESSING LANES

(71) Applicant: Imagination Technologies Limited, Kings Langley (GB)

(72) Inventors: John Howson, St. Albans (GB); Jonathan Redshaw, St. Albans (GB); Yoong Chert Foo, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,278

(22) Filed: Oct. 29, 2021

(65) Prior Publication Data

US 2022/0051363 A1 Feb. 17, 2022

Related U.S. Application Data

(63) Continuation of application No. 16/867,861, filed on May 6, 2020, now Pat. No. 11,189,004, which is a (Continued)

(30) Foreign Application Priority Data

Dec. 18, 2013 (GB) ...................... 1322388

(51) Int. Cl.
*G06T 1/20* (2006.01)
*G06F 15/80* (2006.01)
(Continued)

(52) U.S. Cl.
CPC ............ *G06T 1/20* (2013.01); *G06F 9/30036* (2013.01); *G06F 9/3822* (2013.01);
(Continued)

(58) Field of Classification Search
None
See application file for complete search history.

(56) References Cited

U.S. PATENT DOCUMENTS 6,079,008 A * 6/2000 Clery, III .............. G06F 9/3851
712/E9.05
7,861,060 B1 12/2010 Nickolls
(Continued)

FOREIGN PATENT DOCUMENTS

WO 2005/103888 A2 11/2005

OTHER PUBLICATIONS

Brunie et al. "Simultaneous Branch and Warp Interweaving for Sustained GPU Performance" 2011.
(Continued)

*Primary Examiner* — Yanna Wu
(74) *Attorney, Agent, or Firm* — Potomac Law Group, PLLC; Vincent M DeLuca

(57) ABSTRACT

A SIMD processing unit processes a plurality of tasks which each include up to a predetermined maximum number of work items. The work items of a task are arranged for executing a common sequence of instructions on respective data items. The data items are arranged into blocks, with some of the blocks including at least one invalid data item. Work items which relate to invalid data items are invalid work items. The SIMD processing unit comprises a group of processing lanes configured to execute instructions of work items of a particular task over a plurality of processing cycles. A control module assembles work items into the tasks based on the validity of the work items, so that invalid work items of the particular task are temporally aligned across the processing lanes. In this way the number of wasted processing slots due to invalid work items may be reduced.

20 Claims, 9 Drawing Sheets

Related U.S. Application Data continuation of application No. 16/386,840, filed on Apr. 17, 2019, now Pat. No. 10,679,319, which is a continuation of application No. 15/341,884, filed on Nov. 2, 2016, now Pat. No. 10,311,539, which is a continuation of application No. 14/573,397, filed on Dec. 17, 2014, now Pat. No. 9,513,963.

(51) Int. Cl.
  *G06F 9/38* (2018.01)
  *G06F 9/30* (2018.01)
  *G06F 9/48* (2006.01)

(52) U.S. Cl.
  CPC .......... *G06F 9/3836* (2013.01); *G06F 9/3887* (2013.01); *G06F 15/8007* (2013.01); *G06F 9/4881* (2013.01); *G06F 2209/507* (2013.01)

(56) References Cited

U.S. PATENT DOCUMENTS

| | | | |
|---|---|---|---|
| 2002/0171658 | A1 | 11/2002 | Ramani et al. |
| 2007/0182746 | A1 | 8/2007 | Jiao et al. |
| 2007/0182750 | A1* | 8/2007 | Teruyama ............. G09G 5/395 345/558 |
| 2007/0186077 | A1 | 8/2007 | Gschwind et al. |
| 2008/0091924 | A1 | 4/2008 | Jouppi et al. |
| 2008/0209164 | A1* | 8/2008 | Wildman ............ G06F 15/8053 712/E9.071 |
| 2009/0150647 | A1* | 6/2009 | Mejdrich ............ G06F 9/30189 712/3 |
| 2012/0212573 | A1* | 8/2012 | Park .................. H04N 5/23238 348/36 |
| 2013/0139022 | A1 | 5/2013 | Chen et al. |
| 2015/0170408 | A1 | 6/2015 | He et al. |

OTHER PUBLICATIONS

Hilewitz et al. "A New Basis for Shifters in General-Purpose Processors for Existing and Advanced Bit Manipulations" In: IEEE Transactions on Computers, 58, 2009, 8, S 1035-1048.

Neumann. Bit permutations, Jun. 7, 2013, S. 1-26.

Rhu et al. "Maximizing SIMD Resource Utilization in GPGPUs with SIMD Lane Permutation" In: SIGARCH Comput. Archit. News, 41, Jun. 2013, 3, S. 356-367.

Vaidya et al. "SIMD Divergence Optimization Through Intra-warp Compaction" In: SIGARCH Comput. Archit. News, 41, Jun. 2013, 3, S. 368-379.

Akeley et al; "Real-Time Graphics Architecture"; Lecture 9: Programming GPUs; Stanford Computer Graphics Laboratory, 2007; URL: http://graphics.stanford.edu/courses/cs448-07-spring/lectures/gpu/gpu/.pdf; pp. 1-21.

Wen-Mei et al; "Lecture 3: A Simple Example, Tools, and CUDA Threads"; Ege 498AL; Programming Massively Parallel Processors, University of Illinois, 2009; URL: https://nanohub.org/resources/7234/download/lecture3_cuda_threads_tools_examples.pdf; 7 pages.

Luszczek; "Chapter 4: Data-Level Parallelism in Vector, SIMD, and GPU Architectures"; COSC530: Computer Architecture, University of Tennessee; Oct. 15, 2013; URL: http://www.icl.utk.edu/-luszczek/teaching/courses/fall2013/cosc530/; 9 pages.

Giesen; "A trip through the Graphics Pipeline 2011, part 8"; Jul. 10, 2011; URL: hllps://fgiesen.wordpress.com/2011/07/10/a-trip-through-the-graphics-pipeline-2011-part-8/; 9 pages.

*Note: copies of NPL in parent apn).

Meng et al; "Dynamic Warp Subdivision for Integrated Branch and Memory Divergence Tolerance"; ACM SIGARCH Computer Architecture News; vol. 38; Jun. 2010; pp. 235-246.

* cited by examiner

TASK EXECUTION IN A SIMD PROCESSING UNIT WITH PARALLEL GROUPS OF PROCESSING LANES

BACKGROUND

Single instruction multiple data (SIMD) processing units are arranged to perform the same operation on multiple data items simultaneously. This allows SIMD processing units to process data items in parallel, which may be more efficient than processing each data item in series. SIMD processing units are particularly useful when the same instruction is to be executed on a large number of data items, which is common in multimedia applications. For example, a graphics processing unit (GPU) may use a SIMD processing unit in order to perform operations on each of a large number of pixels of a computer-generated image. Similarly, an image processing unit for processing image data (e.g. captured by a camera), which may for example be part of a camera processing pipeline, may use a SIMD processing unit in order to perform operations on each of a large number of pixels of an image.

A task may be formed of a plurality of "work items," wherein the work items of a task can be executed to thereby execute a common sequence of instructions on respective data items. That is, a work item may comprise a sequence of instructions to be performed on a data item, wherein a group of work items which comprise the same sequence of instructions to be performed on respective data items are grouped together into a task. Each task may include up to a predetermined maximum number of work items. The maximum number of work items that can be included in a task may vary in different systems, but FIG. 1 represents a task 100 which can include up to thirty two work items 102. For clarity, only some of the work items 102 are labelled in FIG. 1. FIG. 1 also indicates some of the thirty two different item positions within the task (from position 0 to position 31) at which a work item may be included. The different work items within a task may be executed in parallel since they are respective instances of an instruction to be implemented on respective data items. The task 100 is not full of work items, and is therefore considered to have "partial residency." That is, the task 100 includes fewer than thirty two work items although it has capacity for thirty two work items. Positions in the task 100 which have shading in FIG. 1 include a work item, whereas positions in the task 100 which are not shaded in FIG. 1 do not include a work item. Therefore, the task 100 includes seventeen work items, for execution on the SIMD processing unit, at positions 0 to 16, and does not include work items at positions 17 to 31. Furthermore, the work items 102 at positions 0 to 6, 9, 11, 15 and 16 are valid work items for execution by a SIMD processing unit. However, as explained in more detail below, some work items may be invalid, in which case they will not be executed by the SIMD processing unit. The work items 102 at positions 7, 8, 10 and 12 to 14 are invalid work items in the example shown in FIG. 1 and are shown as cross-hatched.

A SIMD processing unit may comprise a plurality of processing lanes which are each configured to execute an instruction of a work item in each of a plurality of processing cycles. FIG. 2 represents the processing of tasks using a SIMD processing unit which comprises sixteen processing lanes, denoted 200 in FIG. 2. The combination of a processing lane and a processing cycle comprises a processing "slot" in which an instruction of a work item may be processed. In this case, the processing cycles are clock cycles, and FIG. 2 shows four clock cycles labelled clk 0, clk 1, clk 2 and clk 3. Instructions of the work items from the first sixteen positions of a first task (task 100) are scheduled to execute across the sixteen processing lanes in the first processing cycle (clk 0); and instructions of the work items from the next sixteen positions of the task 100 are scheduled to execute across the sixteen processing lanes in the second processing cycle (clk 1). In the next clock cycles (clk 2 and clk3) the processing lanes are scheduled to execute work items from the next task. Where a task has partial residency then some processing slots will be wasted, i.e. work items will not be executed in those processing slots. This is apparent from FIG. 2, in that task 100 does not include work items at positions 17 to 31, and as such in the second clock cycle (clk 1) an instruction from only one work item ($102_{16}$) will be executed. Therefore, fifteen processing lanes are idle during clock cycle clk1 in the example shown in FIG. 2. Furthermore, if an invalid work item is scheduled for execution in a processing slot then that processing slot is also wasted because invalid work items are not processed. Therefore, in the example shown in FIG. 2 the processing lanes 7, 8, 10, 12, 13 and 14 are idle during the first processing cycle (clk 0) because work items $102_7$, $102_8$, $102_{10}$, $102_{12}$, $102_{13}$ and $102_{14}$ are invalid work items in task 100.

The system shown in FIG. 2 therefore results in wasted processing slots for the reasons given above.

Modern graphics application programming interfaces (APIs) such as OpenGL and Microsoft's DirectX define instructions that operate across pixels within a 2×2 pixel quad. For example it is often necessary to determine the rate of change of a varying quantity between different pixels by way of a "gradient" operation. The presence of these instructions prevents the removal of "empty" pixel slots (which correspond to invalid work items) when packing work items into tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a single instruction multiple data (SIMD) processing unit configured to process a plurality of tasks which each include up to a predetermined maximum number of work items, wherein the work items of a task are arranged for executing a common sequence of instructions on respective data items, the data items being arranged into blocks of data items, wherein some of the blocks include at least one invalid data item, and wherein work items which relate to invalid data items are invalid work items, the SIMD processing unit comprising: a group of processing lanes configured to execute instructions of work items of a particular task over a plurality of processing cycles; and a control module configured to assemble the work items into the tasks, based on the validity of the work items, so that invalid work items of the particular task are temporally aligned across the group of processing lanes.

There is provided a single instruction multiple data (SIMD) processing unit configured to process a plurality of tasks which each include up to a predetermined maximum number of work items, wherein some of the tasks comprise fewer than the predetermined maximum number of work items, and wherein the work items of a task are arranged for executing a common sequence of instructions on respective data items, the SIMD processing unit comprising: a plurality of parallel groups of processing lanes, each group being configured to execute instructions of work items of a respective task over a plurality of processing cycles; and logic coupled to the groups of processing lanes configured to cause a particular group of processing lanes to skip a particular processing cycle, independently of the other groups of processing lanes, if there are no work items scheduled for execution in any of the processing lanes of the particular group in the particular processing cycle.

There is provided a method of using a single instruction multiple data (SIMD) processing unit to process a plurality of tasks which each include up to a predetermined maximum number of work items, wherein the work items of a task are arranged for executing a common sequence of instructions on respective data items, the data items being arranged into blocks of data items, wherein some of the blocks include at least one invalid data item, wherein work items which relate to invalid data items are invalid work items, and wherein the SIMD processing unit comprises a group of processing lanes configured to execute instructions of work items of a particular task over a plurality of processing cycles, the method comprising: assembling the work items into the tasks, based on the validity of the work items so that invalid work items of the particular task are temporally aligned across the group of processing lanes; and executing instructions of work items of the particular task using the group of processing lanes.

There is provided a method of using a single instruction multiple data (SIMD) processing unit to process a plurality of tasks which each include up to a predetermined maximum number of work items, wherein some of the tasks comprise fewer than the predetermined maximum number of work items, and wherein the work items of a task are arranged for executing a common sequence of instructions on respective data items, wherein the SIMD processing unit comprises a plurality of parallel groups of processing lanes, the method comprising: executing, at each group of processing lanes, instructions of work items of a respective task over a plurality of processing cycles; and causing a particular group of processing lanes to skip a particular processing cycle, independently of the other groups of processing lanes, if there are no work items scheduled for execution in any of the processing lanes of the particular group in the particular processing cycle.

There may be provided computer readable code for generating a single instruction multiple data processing unit according to any of the examples described herein. Furthermore, there may be provided a computer readable storage medium having encoded thereon computer readable code for generating a single instruction multiple data processing unit according to any of the examples described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
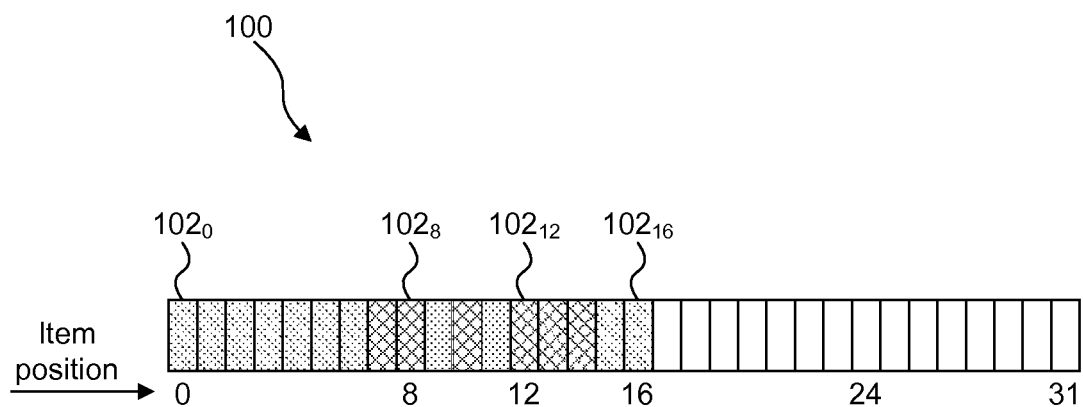
FIG. 1 represents a task which can include up to 32 work items.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only. The examples described herein provide a single instruction multiple data (SIMD) processing unit which is arranged to reduce the number of wasted processing slots due to invalid work items within tasks and/or due to tasks having partial residency. This may be achieved by aligning invalid work items across a group of processing lanes which are configured to execute work items from a task. If there are no valid work items scheduled for execution in a particular processing cycle in any of the processing lanes of the group then the particular processing cycle can be skipped, such that the processing slots in the particular processing cycle are not wasted. Furthermore, in another example, there may be a plurality of groups of processing lanes wherein each group of processing lanes executes work items of a respective task over a plurality of processing cycles. In this case, a particular group of processing lanes may skip a particular processing cycle, independently of the other groups of processing lanes, if there are no work items scheduled for execution in any of the processing lanes of the particular group in the particular processing cycle, irrespective of whether there are work items scheduled for execution in a different group (i.e. work items from a different task) in the particular processing cycle.

Figure 3:
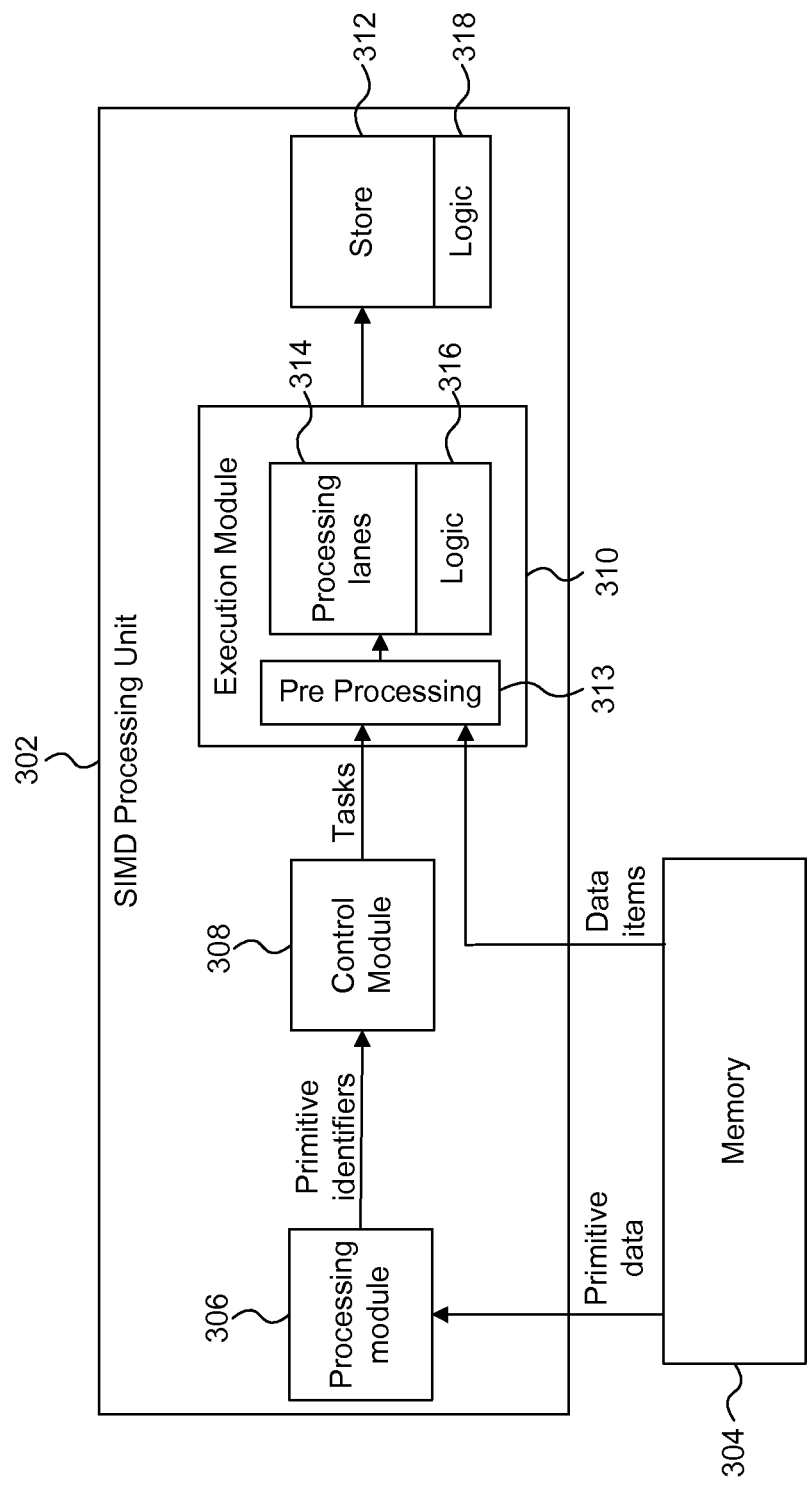
FIG. 3 is a schematic diagram of a SIMD processing unit in accordance with one aspect of the present disclosure.

FIG. 3 shows an example system including a SIMD processing unit 302 and a memory 304. In an example described in detail herein the SIMD processing unit 302 is implemented in a GPU which processes image data in order to render a scene. For example, primitives may be used to define objects in a scene, whereby the primitives are defined by primitive data which specifies, for example, the location and texture of the primitives in the scene. The memory 304 may be system memory or on-chip memory. The SIMD processing unit 302 comprises a processing module 306, a control module 308, an execution module 310 and a store 312. The execution module 310 comprises a pre-processing module 313, a set of processing lanes 314 and logic 316 coupled to the processing lanes 314. The store 312 is coupled to storing logic 318 which can control the storage of data in the store 312. The SIMD processing unit 302, in particular the processing module 306, is arranged to receive primitive data from the memory 304, wherein the primitive data includes information defining the positions of primitives which are to be rendered in an image (e.g. location data for vertices of the primitives). An output of the processing module 306 is coupled to an input of the control module 308. The control module 308 is configured to form tasks of work items which are arranged for executing a common sequence of instructions on respective data items. An output of the control module 308 is coupled to an input of the execution module 310, for outputting tasks from the control module 308 to the execution module 310. The execution module 310 is also arranged to receive data items from the memory 304 in order to execute the work items on the respective data items. The pre-processing module 313 is configured to apply some pre-processing on the work items before passing the work items to the processing lanes 314. The processing lanes 314 of the execution module 310 are configured to execute the work items. The execution module 310 is coupled to the store 312 and is configured to provide processed data items resulting from the execution of the tasks for storage in the store 312. In this example, the data items are pixel values. In other examples, the data items could be other types of data items which are to be processed by a SIMD processing unit. For example, the SIMD processing unit 302 may be configured to execute instructions on fragment values or vertex values, in which case the data items may be fragment values or vertex values accordingly.

Figure 4:
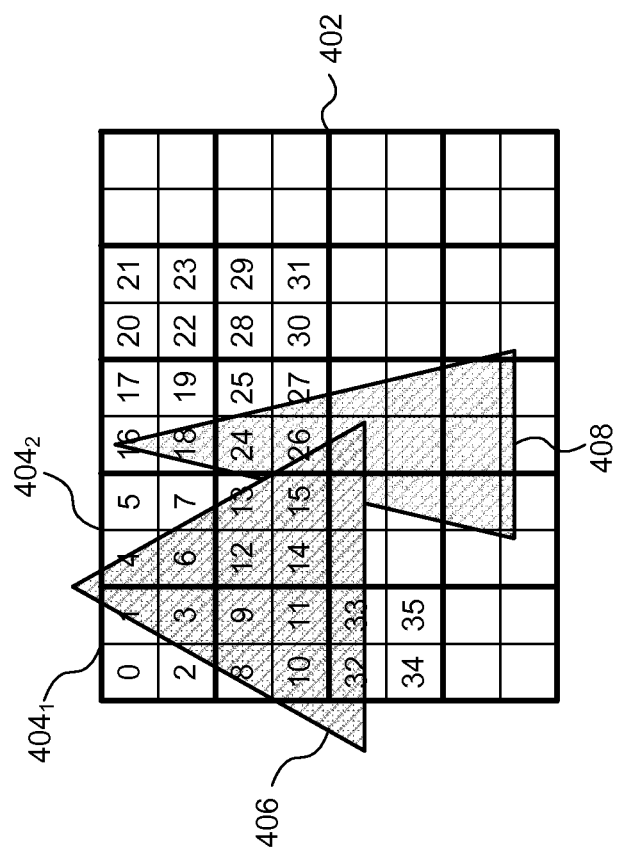
FIG. 4 represents primitives overlapping pixels of an image.

FIG. 4 shows a rendering space 402 which is used by a GPU to render an image. The rendering space 402 comprises a plurality of pixels, some of which are numbered (0 to 35) in FIG. 4. As shown in FIG. 4, the pixels are arranged into blocks of pixels. In particular, in this example the pixels are arranged into pixel quads, such that each block comprises four of the pixels arranged in a 2×2 block. Two of the pixel quads are denoted 404₁ and 404₂ in FIG. 4. Pixels of a pixel quad are processed together by the SIMD processing unit 302 in the sense that if one or more of the pixels within a pixel quad is to be processed then all of the pixels within the pixel quad are scheduled for processing by the SIMD processing unit 302. FIG. 4 also shows two primitives 406 and 408 which are to be rendered in the rendering space 402. As can be seen in FIG. 4 the primitives 406 and 408 overlap some but not all of the pixels within the rendering space 402. A primitive may be considered to overlap a pixel if the primitive covers the sample point of the pixel, which may be assumed to be at the centre of the area attributed to the pixel. Pixels which overlap primitive 406 may be processed by the SIMD processing unit 302, e.g. to apply texturing for the primitive 406 to the relevant pixels. It can be appreciated that the object 406 does not overlap some of the pixels (e.g. pixels 0, 2, 5 or 7) as shown in FIG. 4, but since the object does overlap other pixels from the pixel quads 404₁ and 404₂ then all of the pixel values in the pixel quads 404₁ and 404₂ are sent to the SIMD processing unit 302 for processing, even though for some of the pixel values there may be no processing to perform. The pixel values for which there is no processing to perform but which are sent to the SIMD processing unit 302 for processing (e.g. pixels 0, 2, 5 and 7) may be considered to be "invalid" in the sense that an instruction (e.g. to apply the texturing of primitive 406) is not to be performed for those pixel values. However, it is noted that these invalid pixel values might not be discarded as some instructions defined by standard APIs such as OpenGL may require data to be combined from multiple pixels, e.g. from across the four pixels within a pixel quad.

For example, the pre-processing module 313 might perform some processing on the work items in the tasks, e.g. to determine the rate of change of a varying quantity between different pixels in a pixel quad by way of a "gradient" operation, before the tasks are passed to the processing lanes 314. In that case, the invalid work items that are included in the tasks are used to perform the pre-processing in the module 313, so that the tasks can carry out instructions for the valid work items correctly in the processing lanes 314. In other words, invalid work items for invalid pixels of a pixel quad which includes one or more valid pixels, are included in a task, so that the valid pixel(s) in the pixel quad can be processed correctly in the execution module 310. However, in examples described herein, if there are no valid pixels at all in a pixel quad, then no work items for any of the pixels in the pixel quad are included in a task to be executed by the execution module 310.

It is noted that the example shown in FIG. 4 is shown for illustrative purposes only, and the arrangement of the primitives 406 and 408 over the pixels shown in FIG. 4 does not correspond to the arrangements of invalid work items shown in FIG. 1, 2, 6, 7 or 8.

Figure 5:
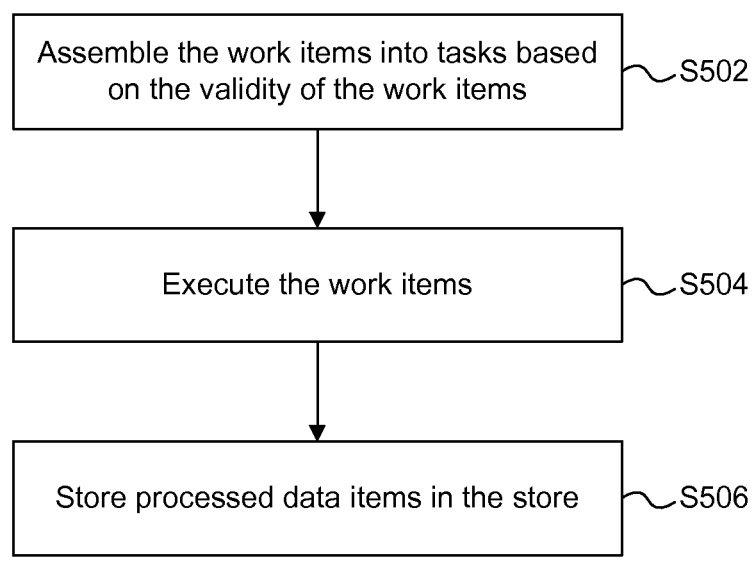
FIG. 5 is a flow chart for a first method of using a SIMD processing unit to process tasks.

Operation of the SIMD processing unit 302 in an example is described with reference to the flow chart shown in FIG. 5. As described above, primitive data is received at the processing module 306 from the memory 304. In this example, the processing module 306 is configured to implement hidden surface removal as is known in the art in order to remove primitives at pixel positions if those primitives are hidden by other primitives in the scene, and as such will not contribute to the final rendered image. The details of the operation of the processing module 306 are beyond the scope of this disclosure, except to say that the processing module 306 passes a primitive identifier to the control module 308, for each of a plurality of pixel positions, which identifies a visible primitive to be processed.

In step S502 the control module 308 groups work items together into tasks to be processed by the execution module 310, i.e. the control module 308 assembles the work items into the tasks. The work items of a task are arranged to execute a common instruction stream on respective pixel values. For example, the work items of a task may relate to applying the texture of primitive 406 to respective pixels within the rendering space 402. More details on how the work items are assembled into tasks are described below in different examples. The tasks are passed to the execution module 310.

The execution module 310 also receives the data items (e.g. the pixel values) in order to execute the work items from the tasks on the data items. In the example shown in FIG. 3, the data items are received at the execution module 310 from the memory 304. It is noted that in other examples the data items may pass from the processing module 306 to the control module 308 and then to the execution module 310, but for efficiency in the example shown in FIG. 3, the data items are only retrieved from the memory 304 when they are needed, i.e. by the execution module 310 and not by the processing module 306 or the control module 308.

Figure 6:
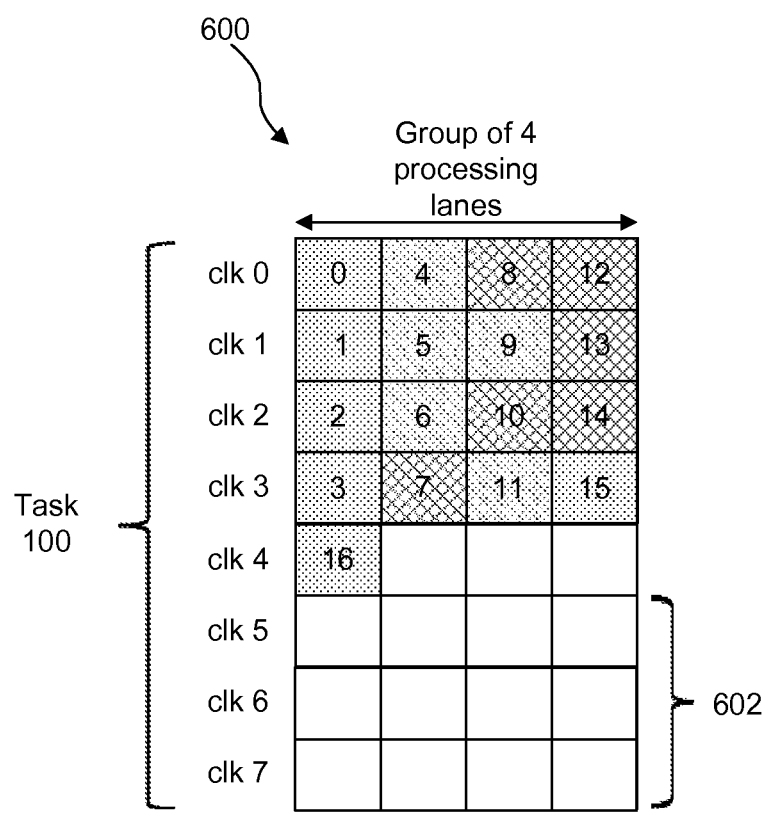
FIG. 6 represents the processing of tasks over a group of processing lanes of the SIMD processing unit in a first example.

In step S504 the work items of the tasks are executed at the execution module 310. As described above, some pre-processing may be performed on the work items by the pre-processing module 313, e.g. to determine the rate of change of a varying quantity between different pixels in a pixel quad by way of a "gradient" operation, before the work items of the tasks are passed to the processing lanes 314. In some examples the pre-processing module 313 is not implemented in the SIMD processing unit and/or no pre-processing is performed before the work items are passed to the processing lanes 314. The work items are then executed by the processing lanes 314. FIG. 6 shows an execution scheme 600 which defines the way in which instructions of the work items of a task are mapped to processing slots in the processing lanes 314 in one example. In this example, as shown in FIG. 6, respective instructions of the thirty two possible work items of a task (e.g. Task 100) are scheduled for execution over a group of four processing lanes and over eight consecutive processing cycles. There may be more than four processing lanes 314 in the execution module 310, some of which may be used to process work items from other tasks simultaneously with the processing of task 100. For example, as described above, there may be sixteen parallel processing lanes, which may be divided into four groups each of four processing lanes configured to process instructions of work items from respective tasks over eight processing cycles. Therefore, if all of the tasks are full of work items (e.g. if they each include thirty two work items) then instructions from all of the work items in the four tasks could be processed in eight processing cycles. This is the same number of tasks over eight processing cycles as in the example shown in FIG. 2 in which instructions from all of the work items in one task may be executed by all of the processing lanes over two processing cycles.

However, FIG. 6 shows the mapping of task 100 (shown in FIG. 1) to the processing slots of the first group of four processing lanes. As described above, the task 100 includes only seventeen work items, and work items 7, 8, 10, 12, 13 and 14 are invalid. In this case, as shown in FIG. 6, three processing cycles (clk 5, clk 6 and clk 7) do not include any scheduled work items from the task 100. If there are no valid work items in a particular processing cycle for a group of processing lanes allocated to the task 100, then the logic 316 causes the group of processing lanes to skip the particular processing cycle. The skipping of processing cycles can be performed independently for different groups of processing lanes. Therefore, in the example shown in FIG. 6 the processing cycles "clk 5", "clk 6" and "clk 7", denoted 602, can be skipped because there are no work items from task 100 scheduled for execution in these processing cycles. The skipping is independent of the other groups of processing cycles, so some other tasks may include work items which are scheduled to execute in other groups of processing lanes in the processing cycles "clk 5", "clk 6" and "clk 7", but this does not prevent these processing cycles being skipped for the group of processing lanes that are processing task 100. Work items which are scheduled to be executed in the next processing cycle clk 8 (which is not shown in FIG. 6) by the group of processing lanes shown in FIG. 6 can then be moved forward to be executed in processing cycle "clk 5". It can therefore be appreciated that although the task 100 includes only seventeen work items (out of a possible thirty two work items), only three processing slots are wasted due to the partial residency of the task 100. This is in contrast to the execution scheme shown in FIG. 2 which processes the same task 100, but in which fifteen processing slots are wasted due to the partial residency of the task 100. It is therefore apparent that by splitting the processing lanes 314 into groups and using a group to process the work items of a particular task, fewer processing slots are wasted due to partial residency of tasks. It is noted that this is achieved by allowing groups of processing lanes to skip processing cycles independently of other groups of processing lanes. It is also noted that this is achieved without changing the total number of processing lanes or the number of work items in a task with respect to the example shown in FIG. 2.

In the example shown in FIG. 6, a block of work items (which corresponds to a pixel quad, i.e. a block of data items) is arranged to execute in a processing lane over consecutive processing cycles. For example, the first processing lane executes the work items 0 to 3 over the first four processing cycles, and the second processing lane executes the work items 4 to 7 over the first four processing cycles, etc. That is, the blocks of work items are arranged in a column-first order with the height of the columns being equal to the number of work items in a block (e.g. four work items for pixel quads). In other examples, the height of the columns may be different, e.g. the columns may include eight work items such that the first processing lane executes the work items 0 to 7 over the first eight processing cycles. In an extreme example, the height of the columns may equal the number of work items in a task (e.g. 32) such that the group of processing lanes is just one lane wide, and the work items of a task are executed by a single processing lane sequentially. This may help to allow more processing cycles to be skipped, but the advantages associated with performing the same instruction on multiple data items in a SIMD manner would be lost, so the processing unit may be more complex and/or less efficient. As described in more detail below, arranging the blocks of work items in column-first order allows for some re-ordering of the work items within a block of work items to be implemented to align invalid work items across the processing lanes.

There are many reasons why a task might not include the maximum number of work items (e.g. thirty two work items in the examples described herein). For example, there may be a delay in the processing pipeline, e.g. due to a delay in processing primitive data at the processing module 306, such that there are not enough work items ready for execution to fill a task when a task is due to be sent to the execution module 310. In this case it may be considered to be better to send a task which is not completely full to the execution module 310 without further delay rather than delaying the task in order to wait for enough work items to be ready for execution to fill the task.

As described above in an example where the data items are pixels, the data items (e.g. pixels) may be arranged into blocks of data items (e.g. into pixel quads). In the example shown in FIG. 6, each of the processing lanes of the group is configured to execute instructions of work items relating to a respective block of data items over a plurality of consecutive processing cycles. That is, instructions of a first block of work items (work items 0 to 3) relating to a first pixel quad are scheduled to execute in a first processing lane in the first four processing cycles; instructions of a second block of work items (work items 4 to 7) relating to a second pixel quad are scheduled to execute in a second processing lane in the first four processing cycles; instructions of a third block of work items (work items 8 to 11) relating to a third pixel quad are scheduled to execute in a third processing lane in the first four processing cycles; and instructions of a fourth block of work items (work items 12 to 15) relating to a fourth pixel quad are scheduled to execute in a fourth processing lane in the first four processing cycles. It can be seen in FIG. 6 that the first block of work items (work items 0 to 3) are all valid; the second block of work items (work items 4 to 7) includes three valid work items and one invalid work item; the third block of work items (work items 8 to 11) includes two valid work items and two invalid work items; and the fourth block of work items (work items 12 to 15) includes one valid work item and three invalid work items.

If all of the work items scheduled for execution over the group of processing lanes in a processing cycle are invalid work items then the logic 316 can cause the group of processing lanes to skip the execution of the invalid work items. This is done in the same way as the skipping of the processing cycles for which no work items have been scheduled. In the example shown in FIG. 6 there are no processing cycles for which only invalid work items are scheduled, and as such none of the first five processing cycles (clk 0 to clk 4) can be skipped. However, since there are only four processing lanes in the group, it is more likely that all of the work items in a processing cycle across the group of processing lanes could be invalid, as compared to the system shown in FIG. 2 in which sixteen work items would need to be invalid for a processing cycle to be skipped by this method.

Furthermore, the likelihood that all of the work items scheduled in a particular processing cycle across the group of processing lanes are invalid work items can be increased by the way in which the control module 308 assembles the work items into the tasks in step S502. In particular, the control module 308 assembles the work items into the tasks based on the validity of the work items so that invalid work items of a particular task are temporally aligned across a group of processing lanes. One constraint on this is that the control module 308 assembles the work items into the tasks such that work items of a block of work items relating to a block of data items are grouped together into the same task. That is, the blocks of work items (e.g. relating to pixel quads) are not separated such that they are included in different tasks. The "assembling" of the work items into the tasks may include: (i) grouping work items into particular tasks, and/or (ii) arranging the work items within a particular task.

Increasing the number of processing cycles that can be skipped increases the efficiency of the execution of the tasks since fewer processing slots are wasted. It is noted that many blocks of work items (e.g. more than can fit into a single task) may be ready for execution, and the control module 308 can determine how the work items are grouped together into tasks. One way in which the control module 308 may assemble the work items into the tasks based on the validity of the work items is to group the blocks of work items together into tasks based on the number of invalid work items in the respective blocks of work items. For example, fully valid blocks of work items (i.e. blocks which include only valid work items) may be packed together into particular tasks such that these tasks do not comprise any invalid work items. In contrast, blocks of work items which include at least one invalid work item may be packed together into other tasks. This can help to increase the likelihood that these other tasks have invalid work items scheduled for execution across a whole group of processing lanes in a particular processing cycle, such that the particular processing cycle can be skipped. In the example shown in FIG. 6, all of the work items in the first block (work items 0 to 3) are valid, and as such none of the first four processing cycles can be skipped irrespective of the validity of the work items in the other blocks of work items scheduled for execution in those processing cycles. By separating fully valid blocks of work items into different tasks to partially valid blocks of work items, the likelihood that the tasks for partially valid blocks of work items have invalid work items scheduled for execution across a whole group of processing lanes in a particular processing cycle is increased.

This idea can be taken further such that blocks of work items which include three valid work items are grouped together into particular tasks; blocks of work items which include two valid work items are grouped together into other tasks; and blocks of work items which include one valid work item are grouped together into further tasks. Therefore, each of the blocks of work items included in a particular task may include the same number of valid work items.

Figure 7:
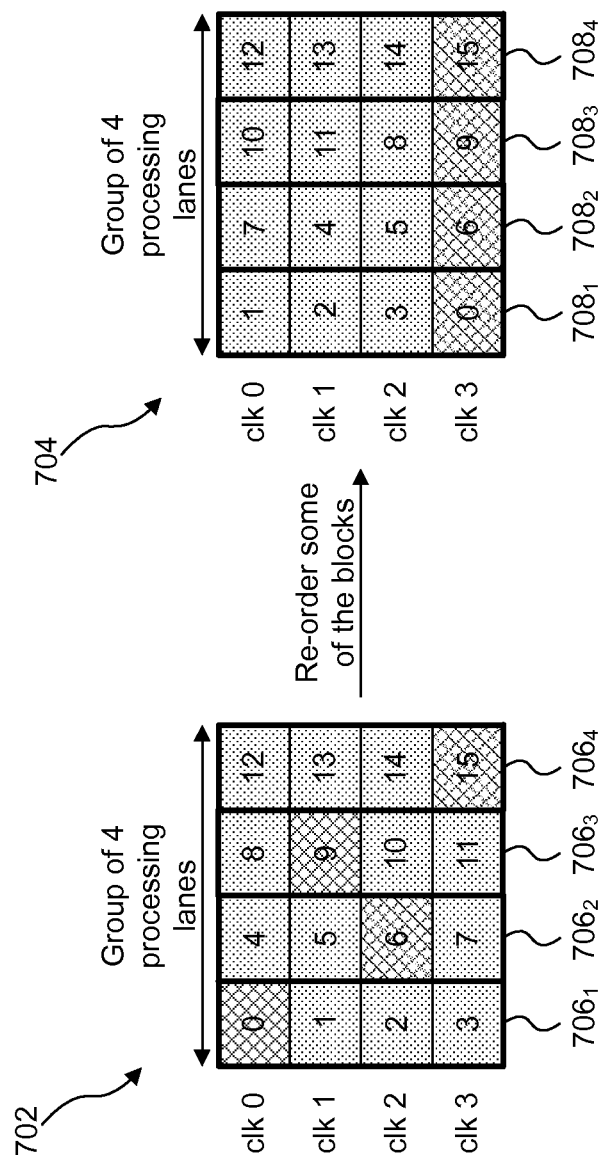
FIG. 7 represents reordering of blocks of work items in a first example.

Furthermore, the control module 308 may be configured to re-order work items within a block of work items in order to align the invalid work items from different blocks of work items within a task. FIG. 7 shows an example in which blocks of work items are re-ordered from a first configuration 702 to give a second configuration 704 in which invalid work items from the blocks of work items are temporally aligned across the group of processing lanes. The example shown in FIG. 7 relates to a case in which a task includes blocks of work items which each include one invalid work item. As shown in FIG. 7, there are four blocks of work items denoted $706_1$, $706_2$, $706_3$ and $706_4$ which are to be executed over the four processing lanes of a group in four processing cycles. The work items 0, 6, 9 and 15 are invalid whilst the other work items are valid. Before re-ordering of the work items, according to the configuration 702, none of the processing cycles can be skipped because they all include at least one valid work item from one of the blocks 706.

The control module 308 re-orders the work items within some of the blocks 706, e.g. by rotating the work items within the blocks. For example, the work items in the block $706_1$ are rotated three times. Each rotation operation involves shifting the work items down a position wherein the work item at the bottom is then placed at the top. The result of the three rotation operations is shown in the rotated block $708_1$, such that the invalid work item is at the lowest position of the block $708_1$. It is noted that the work items could be rotated in the opposite direction by one position to achieve the same result. In general if n is the number of rotation operations in a first direction, and W is the number of work items in a block, then the number of rotation operations, m, in the opposite direction that is equivalent to the n rotations in the first direction is given by: m=W−n.

The control module 308 also performs one rotation operation on the work items of the second block $706_2$ to arrive at the re-ordered block $708_2$. Therefore, the invalid work item 6 is at the lowest position of the block $708_2$. Similarly, the control module 308 also performs two rotation operations on the work items of the third block $706_3$ to arrive at the re-ordered block $708_3$. Therefore, the invalid work item 9 is at the lowest position of the block $708_3$. The fourth block $706_4$ does not need to be re-ordered since the invalid work item 15 is already at the lowest position of the block $706_4$. Therefore the block $708_4$ is the same as the block $706_4$. It can be seen that in the re-ordered configuration 704, the invalid work items of the blocks 708 are temporally aligned. Therefore when the tasks are scheduled for execution at the execution module 310, the logic 316 will determine that the processing cycle clk 3 can be skipped because all of the work items scheduled in that processing cycle for execution on the processing lanes 314 of the group are invalid and therefore do not need to be processed. It is apparent that the re-ordering of the work items in the blocks of work items allows the processing of invalid work items to be skipped, thereby reducing the number of wasted processing slots.

In the example, described above all of the invalid work items are aligned at the lowest positions of the blocks 708. In other examples, the invalid work items could be aligned at other positions within the blocks 708. The number of rotation operations performed on the work items of each of the blocks 706 is determined by the control module 308 in order to temporally align the invalid work items.

The control module 308 sets indicators (e.g. a few bits per work item or per block of work items) to indicate how the work items have been assembled into the tasks. The indicators may be included with the work items as they are sent to the execution module 310, or may be stored in a memory (which may be a different memory than memory 304, and would preferably be on-chip memory such that the writing and reading to the memory includes a short delay) for subsequent retrieval, such that the processed data items can be re-ordered on the output of the processing lanes 314 in accordance with any re-ordering of the work items that occurred as the work items were packed into tasks. In the example shown in FIG. 7, each block of work items is rotated by a number of rotation operations between zero rotation operations and three rotation operations. Therefore, in one example, an indicator can be set with two bits for each block of work items to indicate the number of rotation operations that have been applied to the work items of the block 706. In another example, one of the blocks of work items (e.g. the first block of work items in the task) does not need an indicator, and the work items within the other blocks can be re-ordered to match the alignment of the invalid work items in said one of the blocks of work items. This can reduce the number of bits needed for the indicators. The indicators for the blocks of work items indicate the order of the work items within the blocks of work items.

Figure 8:
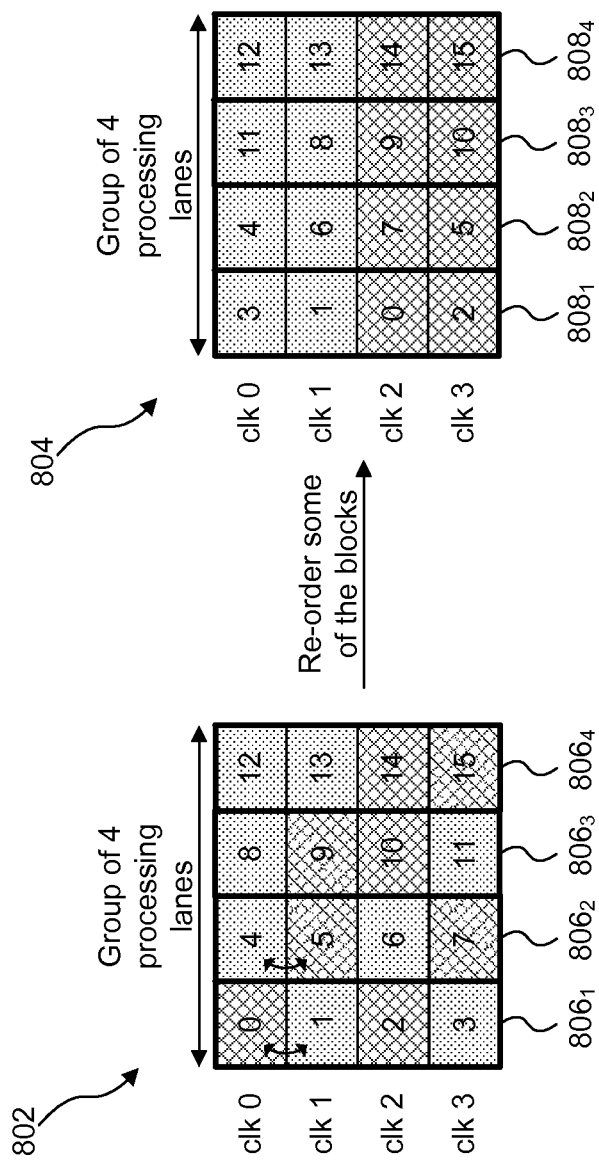
FIG. 8 represents reordering of blocks of work items in a second example.

FIG. 8 shows another example in which blocks of work items are re-ordered from a first configuration 802 to give a second configuration 804 in which invalid work items from the blocks of work items are temporally aligned across the group of processing lanes. The example shown in FIG. 8 relates to a case in which a task includes blocks of work items which each include two invalid work items. As shown in FIG. 8, there are four blocks of work items denoted $806_1$, $806_2$, $806_3$ and $806_4$ which are to be executed over the four processing lanes of a group in four processing cycles. The work items 0, 2, 5, 7, 9, 10, 14 and 15 are invalid whilst the other work items are valid. Before re-ordering of the work items, according to the configuration 802, none of the processing cycles can be skipped because they all include at least one valid work item from one of the blocks 806.

The control module 308 re-orders the work items within some of the blocks 806, e.g. by selectively swapping the first two work items in the block and rotating the work items within the blocks. For example, a swapping operation is performed to swap the first two work items in the block $806_1$ and then the work items in the block $806_1$ are rotated once. As described above, the rotation operation involves shifting the work items down a position wherein the work item at the bottom is then placed at the top. The result of the swapping operation and the rotation operation is shown in the rotated block $808_1$, such that the invalid work items (work items 0 and 2) are at the lowest two positions of the block $808_1$. As described above, it is noted that the rotation operation could be performed in the other direction.

The control module 308 also performs a swapping operation on the first two work items in the block $806_2$ and performs three rotation operations on the work items of the second block $806_2$ to arrive at the re-ordered block $808_2$. Therefore, the invalid work items 5 and 7 are at the lowest two positions of the block $808_2$. The control module 308 does not perform a swapping operation on the work items in the block $806_3$ but does perform a rotation operation on the work items of the third block $806_3$ to arrive at the re-ordered block $808_3$. Therefore, the invalid work items 9 and 10 are at the lowest two positions of the block $808_3$. The fourth block $806_4$ does not need to be re-ordered since the invalid work items 14 and 15 are already at the lowest two positions of the block $806_4$. Therefore the block $808_4$ is the same as the block $806_4$. It can be seen that in the re-ordered configuration 804, the invalid work items of the blocks 808 are temporally aligned. Therefore when the tasks are scheduled for execution at the execution module 314, the logic 316 will determine that the processing cycles clk 2 and clk 3 can be skipped because all of the work items scheduled in those processing cycles for execution on the processing lanes of the group are invalid and therefore do not need to be processed. It is apparent that the re-ordering of the work items in the blocks of work items allows the processing of invalid work items to be skipped, thereby reducing the number of wasted processing slots.

In the example, described above all of the invalid work items are aligned at the lowest two positions of the blocks 808. In other examples, the invalid work items could be aligned at other positions within the blocks 808. The selective swapping of the first two work items in the blocks and the number of rotation operations performed on the work items of each of the blocks 806 is determined by the control module 308 in order to temporally align the invalid work items. Furthermore, in other examples different ones of the work items may be selectively swapped by the swapping operations. However, the positions of the work items which may be swapped is predetermined in a particular example such that no bits are required to indicate which work items have been swapped. Each of the indicators to indicate how the work items have been re-ordered for a plurality of the blocks 808 may include three bits: two bits to define a rotation of the work items within the block 808 and one bit to define whether a swapping operation has been performed on two of the work items at the predetermined positions within the block of work items.

For tasks which include blocks of work items which each include three invalid work items, the re-ordering of the blocks is performed in a corresponding manner to that shown in FIG. 7 and described above in relation to tasks including blocks of work items which include one invalid work item. That is, no swapping operations are performed but some rotation operations may be performed to temporally align the invalid work items from different blocks of work items within a task.

Referring back to FIG. 5, when the work items have been processed by the processing lanes 314, in step S506 the data items output from the processing lanes 314 are stored in the store 312. The storing logic 318 uses the indicator which indicates how the work items have been assembled into the tasks in order to determine addresses for storing the processed data items in the store 312. That is, although the work items may be re-ordered for execution by the processing lanes 314, when the results are stored in the store, the storage address is determined so that the processed data items are stored at the correct addresses in the store 312, e.g. as if the work items had not been re-ordered.

In the examples described above, the work items can have one of two levels of validity: a work item is either valid or invalid. However, in other examples, there may be more than two levels of validity which the work items could have. For example, a texturing operation may be performed on a pixel which may involve using the gradients from the neighbouring pixels (e.g. not including diagonal neighbours). In this case, if the texturing operation is to be performed on a particular pixel of a pixel quad then the particular pixel may be considered to be a valid data item, on which a large number of instructions are to be executed by the processing lanes 314 to implement the texturing operation; whilst the neighbouring pixels, excluding the diagonal neighbour, in the pixel quad may be considered to be partially invalid data items, on which a smaller number of instructions are to be executed by the processing lanes 314 to implement the texturing operation; whilst the diagonal neighbour in the pixel quad may be considered to be a fully invalid data item, on which no, or a very small number of, instructions are to be executed by the processing lanes 314 to implement the texturing operation. It may be useful to align work items which have the same level of validity. In this way, when instructions are to be performed on valid and partially invalid data items, but instructions are not to be performed on invalid data items then the invalid work items corresponding to the invalid data items are aligned and can be skipped. Furthermore, when all of the instructions for the partially invalid data items have been performed, but instructions are still to be performed on the valid data items, then the partially invalid work items are aligned and can be skipped.

As stated previously some instructions utilise information from other pixels within a 2×2 pixel block, for example texturing calculates gradients across pixels in order to determine level of detail in a well-known manner in the art. As such, instructions that feed results into this type of instruction (e.g. texturing instructions) are executed on some invalid pixels within a 2×2 pixel block, e.g. by the pre-processing module 313. As some instructions do not contribute to cross 2×2 block instructions it is desirable to differentiate between the two types of instructions. In order to do this it is suggested that a bit is included in the instruction encoding to indicate if an instruction needs to be executed on an invalid instance.

Figure 9:
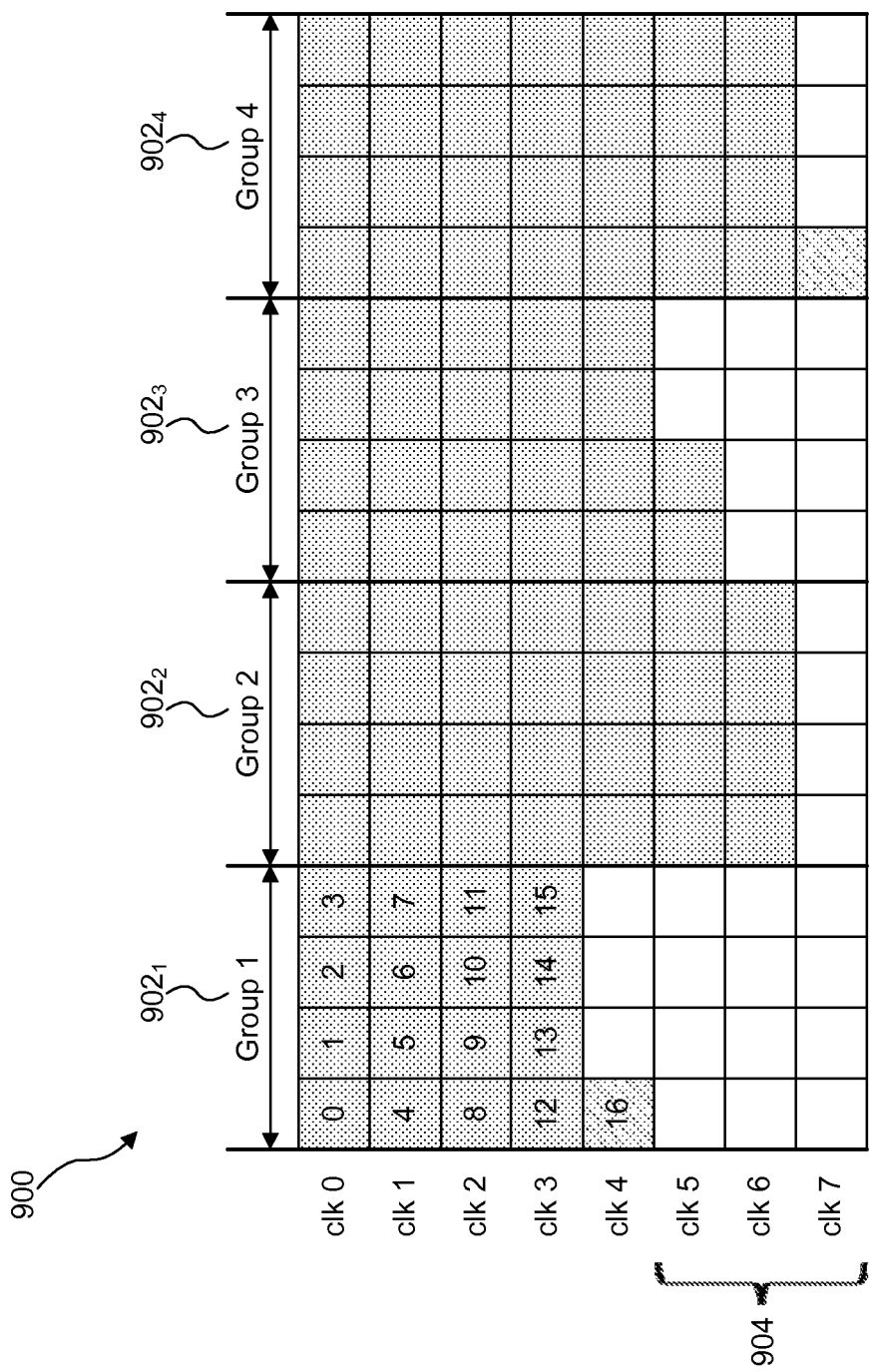
FIG. 9 represents the processing of tasks over a group of processing lanes of the SIMD processing unit in a second example.

Another example of how work items from tasks may be executed across a plurality of processing lanes is described with reference to FIGS. 9 and 10. FIG. 9 shows an execution scheme 900 which defines the way in which the work items of a task are mapped to processing slots in the processing lanes 314 in one example. In this example, there are sixteen processing lanes (which is the same as in the examples described above), and the processing lanes are divided into four parallel groups $902_1$, $902_2$, $902_3$ and $902_4$ which each include four processing lanes. Similar to the example described above in relation to FIG. 6, instructions of the thirty two possible work items of a task are scheduled for execution over a group of four processing lanes and over eight consecutive processing cycles. That is, each group of processing lanes is configured to execute work items of a respective task over a plurality of processing cycles. FIG. 9 shows how instructions of the work items of a task which includes only seventeen work items are scheduled across the processing lanes of the group $902_1$ in this example.

In the example shown in FIG. 9, the number of work items in a block of work items (e.g. four in the case of pixel quads as described above) is equal to the number of processing lanes in each of the groups of processing lanes (e.g. four). In this way, for each of the groups, in each of the processing cycles, the processing lanes of the group are configured to execute instructions of work items relating to respective data items from a block of data items. In other words, the blocks of work items are arranged in a row-first order. For example, as shown in FIG. 9, instructions of the work items 0 to 3 of the first block of work items of a task are executed in a first processing cycle (clk 0) across the processing lanes of the group $902_1$; instructions of the work items 4 to 7 of the second block of work items of a task are executed in a second processing cycle (clk 1) across the processing lanes of the group $902_1$; instructions of the work items 8 to 11 of the third block of work items of a task are executed in a third processing cycle (clk 2) across the processing lanes of the group $902_1$; instructions of the work items 12 to 15 of the fourth block of work items of a task are executed in a fourth processing cycle (clk 3) across the processing lanes of the group $902_1$; and an instruction of work item 16 of the fifth block of work items of the task is executed in a fifth processing cycle (clk 4) in one of the processing lanes of the group $902_1$.

Figure 10:
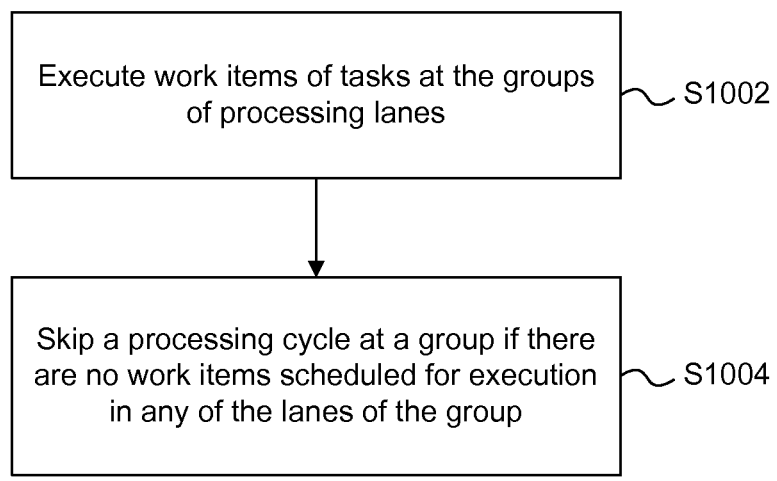
FIG. 10 is a flow chart for a second method of using a SIMD processing unit to process tasks.

FIG. 10 outlines the basic steps of the method of using the SIMD processing unit 302 to process tasks using the execution scheme 900 shown in FIG. 9. In step S1002 the work items of the tasks are executed at the respective groups of processing lanes 902 in accordance with the execution scheme 900 shown in FIG. 9. In step S1004, similarly to as described above in relation to the example shown in FIG. 6, a particular group of processing lanes skips a particular processing cycle, independently of the other groups of processing lanes, if there are no work items scheduled for execution in any of the processing lanes of the particular group in the particular processing cycle.

For example, with reference to FIG. 9, the task assigned to the group of processing lanes $902_1$ does not include any work items scheduled to be executed in processing cycles clk 5 to clk 7, denoted 904 in FIG. 9. Therefore the group of processing lanes $902_1$ may skip these processing cycles 904. Other work items from subsequent tasks (not shown in FIG. 9) may be executed in the processing lanes of the group $902_1$ over the processing cycles 904. In this way, the processing slots in the first group of processing lanes $902_1$ in the processing cycles 904 are not wasted. This is the same as described above in relation to FIG. 6.

However, the example shown in FIG. 9 may waste fewer processing slots than the example shown in FIG. 6 in some situations. For example, if the task assigned to the group $902_1$ includes twenty work items then according to the execution scheme 900 the work items would take up all of the processing slots in the group of processing lanes $902_1$ in the first five processing cycles, but the later processing cycles 904 would still be empty and as such can be skipped. In contrast, in the example shown in FIG. 6, a task including twenty work items would schedule a work item to be executed in each of the eight processing cycles, clk0 to clk 7, and as such would waste twelve processing slots.

Furthermore, the execution scheme 900 shown in FIG. 9 may be particularly suited for use with divergent flow control. As described above, the SIMD processing unit 302 is configured to execute tasks which include multiple instances of the same instruction to be performed on respective data items. That is, the same instruction is performed on multiple data items in a particular processing cycle for a task. However, some instructions may cause different subsequent instructions to be performed based on the specific data items which are being processed. For example, IF-THEN-ELSE constructs may result in a first instruction ("instruction A") being scheduled for execution on a first set of data items and a second instruction ("instruction B") being scheduled for execution on a second set of data items. In this case the first instruction may be executed on all of the data items, but a first mask is used such that only the results of executing the instruction on the first set of data values (i.e. not the second set of data values) is used to update the values in the store 312. Then the second instruction may be executed on all of the data items, but a second mask is used such that only the results of executing the instruction on the second set of data values (i.e. not the first set of data values) is used to update the values in the store 312. This means that the instruction is performed twice and therefore is scheduled over twice the number of processing cycles. However, if all of the work items scheduled for a processing cycle are masked out then that processing cycle can be skipped.

Figure 2:
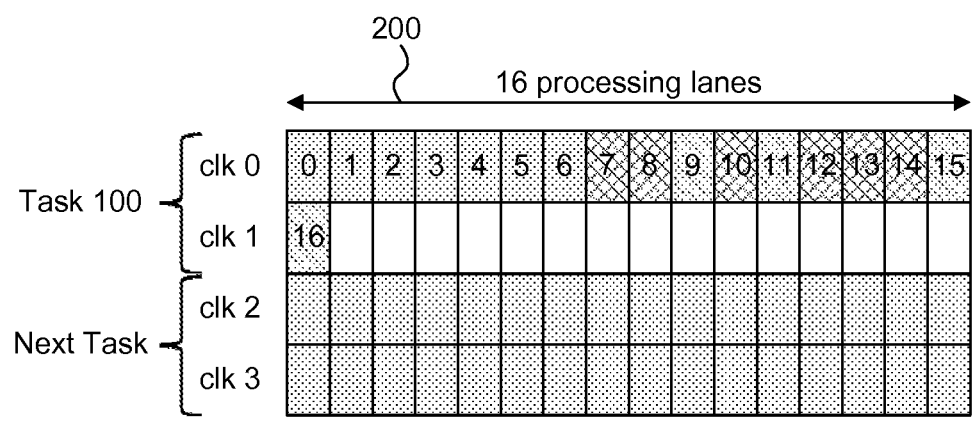
FIG. 2 represents the processing of tasks using a conventional SIMD processing unit.

Since the group of processing lanes for a task includes only four processing lanes, it is more likely than in the example shown in FIG. 2 that all of the processing lanes for a task include a masked out work item in a particular processing cycle. Since processing cycles can be skipped for groups of processing lanes independent of other processing lanes, more processing slots can be skipped by dividing the total number of processing lanes into groups. That is, dividing the total number of processing lanes into groups as described herein provides a finer granularity when skipping processing cycles on divergent flow control.

Furthermore, the execution scheme 900 shown in FIG. 9 may be even more suited for use with divergent flow control than the execution scheme 600 shown in FIG. 6. This is because often work items from the same block of work items will diverge in a similar manner, and according to the execution scheme 900 each group of processing lanes 902 processes work items from only one block in each processing cycle. Therefore if one work item from a block of work items is masked out for a particular processing cycle, then it is likely that the other work items in that block are also masked out for the particular processing cycle, such that the particular processing cycle can be skipped for the appropriate group of processing lanes.

As mentioned above, tasks include a plurality of work items that execute a common instruction stream on a corresponding plurality of data items. Rather than executing all of the instructions of a task consecutively and then moving onto the next task, there may be a plurality of tasks for which instructions are performed in sequence. That is, there may be a group of $N_{task}$ tasks (e.g. where $N_{task}$ may equal twenty as an example) for which instructions are performed in sequence such that an instruction from a first task is performed, then an instruction from the next task is performed, and so on through the $N_{task}$ tasks of the group. Then the sequence cycles back so that the next instruction from the first task is performed, then the next instruction from the next task is performed, and so on. In this way, there is a period of time between the execution of instructions from a particular task. This may be useful because it allows for processing latency (e.g. for reading or writing data, etc.) which may be associated with the instructions that are performed on the data items, before the next instruction of the task is executed. The number of tasks, $N_{task}$, which are in the group of tasks for which work items are executed before repeating tasks, may be different in different examples and may be fixed or variable in different examples. For example, $N_{task}$ may be varied depending upon the number of processing cycles which have been skipped, e.g. due to the methods described herein. The more processing cycles are skipped, the sooner the next instruction of a task will be performed after completion of the previous instruction of the task, and therefore the less time is allowed for processing latency. Therefore, if the number of processing cycles which have been skipped in a given time period increases then the number $N_{task}$ may be increased, e.g. with the aim of providing an approximately constant time between executing consecutive instructions from a particular task, to thereby allow for a particular processing latency for the instructions of the task.

In the examples described above, a task includes a maximum of thirty two work items. More generally, in other examples, the maximum number of work items included in a task, $N_{work}$, may be any number, but for convenience $N_{work}$ would normally be a power of two.

In the examples described above, there are sixteen processing lanes 314 in the execution module 310. More generally, in other examples, there may be any number of processing lanes in the execution module, but for convenience the number of processing lanes in the execution module, $N_{proc}$, would normally be a power of two.

Furthermore, in the examples described above, there are four data items in a block of data items. That is, in the main examples described herein, the blocks of data items are pixel quads. More generally in other examples, there may be any number of data items in each block of data items, but for convenience the number of data items in each block of data items, $N_{items}$, would normally be a power of two. Furthermore, for convenience $N_{items}$ may be chosen to be a factor of $N_{proc}$ (i.e. $N_{proc}$ mod $N_{items}$=0) so that an integer number of blocks of work items can be processed across all of the processing lanes in a processing cycle.

Furthermore, as described above, the data items are pixel values in the case of the SIMD processing unit 302 which processes graphics data as part of a GPU. However, in other examples, the data items might not be pixel values and may instead be other types of data items, such as fragment values or vertex values, or non-graphics data items for example when the processing unit 302 is running an OpenCL program to perform a general purpose parallel computation. The data items are suitable for processing by a SIMD processing unit, in the sense that multiple instances of an instruction are performed on different data items in parallel.

In the examples described herein the processing cycles are clock cycles. More generally, in other examples, each processing cycle may include one or more clock cycles.

Generally, any of the functions, methods, techniques or components described above can be implemented in modules using software, firmware, hardware (e.g., fixed logic circuitry), or any combination of these implementations. The terms "module," "functionality," "component", "unit" and "logic" are used herein to generally represent software, firmware, hardware, or any combination thereof.

In the case of a software implementation, the module, unit, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, unit, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, unit, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, unit, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A single instruction multiple data (SIMD) processing unit configured to process a plurality of tasks which each include up to a predetermined maximum number of work items, wherein the work items of a task are arranged for executing a common sequence of instructions on respective data items, wherein blocks of work items within a task relate to respective blocks of data items, each block of data items being a pixel quad, the SIMD processing unit comprising:
   a group of processing lanes configured to execute instructions of work items of a particular task over a plurality of processing cycles, wherein each of the processing lanes of the group is configured to execute instructions of a respective block of work items over a plurality of consecutive processing cycles; and
   logic coupled to the group of processing lanes configured to cause the group of processing lanes to skip a particular processing cycle in response to making a determination that there are no valid work items scheduled for execution over the group of processing lanes in the particular processing cycle.

2. The SIMD processing unit of claim 1, wherein the logic is configured to set indicators to indicate how the work items have been assembled into the tasks.

3. The SIMD processing unit of claim 2, further comprising:
   a store configured to store the processed data items output from the group of processing lanes; and
   storing logic configured to determine addresses for storing the processed data items in the store based on the indicators.

4. The SIMD processing unit of claim 1, wherein the logic is configured to assemble the work items into the tasks such that work items of a block of work items are grouped together into the same task.

5. The SIMD processing unit of claim 1, wherein the work items are assembled into blocks of work items such that each work item within a block of work items can be used to perform a pre-processing operation on the block of work items before it is passed to the group of processing lanes.

6. The SIMD processing unit of claim 5, wherein the pre-processing operation is a gradient operation configured to determine the rate of change of a varying quantity between different pixels in a pixel quad.

7. The SIMD processing unit of claim 1, wherein there are no valid work items scheduled for execution over the group of processing lanes in the particular processing cycle if all of the work items which are scheduled for execution over the group of processing lanes in the particular processing cycle are invalid work items.

8. The SIMD processing unit of claim 1, wherein there is not a valid work item scheduled for execution in a processing lane in a particular processing cycle if there is not a work item which is scheduled for execution in the processing lane in the particular processing cycle.

9. The SIMD processing unit of claim 8, wherein work items which are not ready for execution when the task is due to be sent to the group of parallel processing lanes are not scheduled for execution.

10. The SIMD processing unit of claim 1, wherein some of the tasks comprise fewer than the predetermined maximum number of work items, and wherein the SIMD processing unit comprises a plurality of parallel groups of processing lanes, each group being configured to execute instructions of work items of a respective task over a plurality of processing cycles.

11. The SIMD processing unit of claim 10, wherein the logic coupled to the groups of processing lanes is further configured to cause a particular group of processing lanes to skip a particular processing cycle, independently of the other groups of processing lanes, if there are no valid work items scheduled for execution in any of the processing lanes of the particular group in the particular processing cycle.

12. The SIMD processing unit of claim 11, wherein the logic is configured to cause a particular group of processing lanes to skip a particular processing cycle whilst work items are scheduled to execute in the other groups of processing lanes in the particular processing cycle.

13. The SIMD processing unit of claim 1, wherein there are three levels of validity for pixels of a pixel quad, a first level of validity being full validity, a second level of validity being partial invalidity and a third level of validity being full invalidity, and wherein the logic is configured to:
    skip a first particular processing cycle comprising work items corresponding to pixels of the third level of validity when instructions are to be executed on pixels of the first and second levels of validity, but instructions are not to be executed on pixels of the third level of validity; and
    skip a second particular processing cycle comprising work items corresponding to pixels of the second level of validity when instructions are to be executed on pixels of the first level of validity, but instructions are not to be executed on pixels of the second level of validity.

14. The SIMD processing unit of claim 13, wherein the instructions to be executed on pixels of the first and second levels of validity form part of a texturing operation to be performed on a particular pixel of a pixel quad, and wherein the particular pixel is of the first level of validity, the neighbouring pixels in the pixel quad excluding the diagonal neighbour of the particular pixel are of the second level of validity, and the diagonal neighbour in the pixel quad is of the third level of validity.

15. A method of using a single instruction multiple data (SIMD) processing unit to process a plurality of tasks which each include up to a predetermined maximum number of work items, wherein the work items of a task are arranged for executing a common sequence of instructions on respective data items, wherein blocks of work items within a task relate to respective blocks of data items, each block of data items being a pixel quad, wherein the SIMD processing unit comprises a group of processing lanes configured to execute instructions of work items of a particular task over a plurality of processing cycles, the method comprising:
    executing instructions of work items of the particular task using the group of processing lanes, wherein each of the processing lanes of the group executes instructions of a respective block of work items over a plurality of consecutive processing cycles; and
    causing the group of processing lanes to skip a particular processing cycle in response to making a determination that there are no valid work items scheduled for execution over the group of processing lanes in the particular processing cycle.

16. The method of claim 15, further comprising setting indicators to indicate how the work items have been assembled into the tasks.

17. The method of claim 16, further comprising:
    determining addresses for storing the processed data items in a store based on the indicators; and
    storing, at the determined addresses in the store, the processed data items output from the group of processing lanes.

18. The method of claim 15, wherein said assembling the work items into the tasks comprises grouping work items of a block of work items relating to a pixel quad together into the same task.

19. The method of claim 15, wherein some of the tasks comprise fewer than the predetermined maximum number of work items, and wherein the SIMD processing unit comprises a plurality of parallel groups of processing lanes, the method comprising:
    executing, at each group of processing lanes, instructions of work items of a respective task over a plurality of processing cycles; and
    causing a particular group of processing lanes to skip a particular processing cycle, independently of the other groups of processing lanes, if there are no valid work items scheduled for execution in any of the processing lanes of the particular group in the particular processing cycle.

20. A non-transitory computer readable storage medium having stored thereon an integrated circuit dataset description that when inputted causes an integrated circuit manufacturing system to generate a single instruction multiple data (SIMD) processing unit configured to process a plurality of tasks which each include up to a predetermined maximum number of work items, wherein the work items of a task are arranged for executing a common sequence of instructions on respective data items, wherein blocks of work items within a task relate to respective blocks of data items, each block of data items being a pixel quad, the SIMD processing unit comprising:
    a group of processing lanes configured to execute instructions of work items of a particular task over a plurality of processing cycles, wherein each of the processing lanes of the group is configured to execute instructions of a respective block of work items over a plurality of consecutive processing cycles; and
    logic coupled to the group of processing lanes configured to cause the group of processing lanes to skip a particular processing cycle in response to making a determination that there are no valid work items scheduled for execution over the group of processing lanes in the particular processing cycle.

* * * * *